(12) United States Patent
Narlikar

(10) Patent No.: US 12,033,205 B2
(45) Date of Patent: Jul. 9, 2024

(54) REPLACING ONE OR MORE GENERIC ITEM DESCRIPTIONS IN A RECIPE TO ACCOMMODATE USER PREFERENCES FOR ITEMS BASED ON DETERMINED RELATIONSHIPS BETWEEN GENERIC ITEM DESCRIPTIONS

(71) Applicant: Maplebear Inc., San Francisco, CA (US)

(72) Inventor: Girija Narlikar, Palo Alto, CA (US)

(73) Assignee: Maplebear Inc., San Francisco, CA (US)

( * ) Notice: Subject to any disclaimer, the term of this patent is extended or adjusted under 35 U.S.C. 154(b) by 105 days.

(21) Appl. No.: 17/524,469

(22) Filed: Nov. 11, 2021

(65) Prior Publication Data

US 2023/0147670 A1    May 11, 2023

(51) Int. Cl.
    *G06Q 30/0601*    (2023.01)
(52) U.S. Cl.
    CPC ..... *G06Q 30/0631* (2013.01); *G06Q 30/0641* (2013.01)
(58) Field of Classification Search
    CPC .................. G06Q 30/0631; G06Q 30/0641
    USPC ....................................................... 705/26.7
    See application file for complete search history.

(56) References Cited

U.S. PATENT DOCUMENTS

| 9,797,873 | B1 * | 10/2017 | Feller | G01N 33/00 |
| 11,521,734 | B2 * | 12/2022 | Lynn | G06Q 30/0623 |
| 2014/0214590 | A1 * | 7/2014 | Argue | G06Q 30/0631 |
| | | | | 705/26.7 |
| 2017/0031995 | A1 * | 2/2017 | Bhatt | G16H 20/60 |
| 2019/0171707 | A1 * | 6/2019 | Rapaport | G06F 40/151 |
| 2019/0355465 | A1 * | 11/2019 | Salehian | G06N 5/02 |
| 2020/0073935 | A1 * | 3/2020 | Hite | G06N 20/00 |
| 2020/0110746 | A1 * | 4/2020 | Lecue | G06F 16/2465 |

FOREIGN PATENT DOCUMENTS

WO    WO-2023152617 A1 *    8/2023

OTHER PUBLICATIONS

Sharai, Sola, et al, "Identifying Ingredient Substitutions Using a Knowledge Graph of Food," Jan. 25, 2021, Front. Artif. Intell., Sec. AI in Food, Agriculture and Water, vol. 3, 2020 (Year: 2021).*

(Continued)

*Primary Examiner* — Marissa Thein
*Assistant Examiner* — Thomas Joseph Sullivan
(74) *Attorney, Agent, or Firm* — Fenwick & West LLP

(57) ABSTRACT

An online concierge system modifies generic item descriptions included in a recipe displayed to a user based on the user's preferences. The online concierge system generates a replacement graph identifying a replacement generic item description for a generic item description, one or more preferences causing replacement of the generic item description with the replacement generic item description, and a replacement quantity of the replacement generic item description. To customize a recipe for the user, the online concierge system selects replacement generic item descriptions for one or more generic item descriptions in the recipe satisfying one or more stored preferences for the user based on the replacement graph.

20 Claims, 6 Drawing Sheets

(56) References Cited

OTHER PUBLICATIONS

Haussmann, Steven, et al, "FoodKG: A Semantics-Driven Knowledge Graph for Food Recommendation", Oct. 2019, In book: The Semantic Web—ISWC 2019 (pp. 146-162) (Year: 2019).*

Nadee, Wanvimol, et al, "Alternative-Ingredient Recommendation Based on Correlation Weight for Thai Recipes," Mar. 3, 2021, Joint International Conference on Digital Arts, Media and Technology with ECTI Northern Section Conference on Electrical, Electronics, Computer and Telecommunication Engineering (Year: 2021).*

Chen, Yu, et al, "Personalized Food Recommendation as Constrained Question Answering over a Large-scale Food Knowledge Graph", Mar. 8-12, 2021, WSDM '21, Mar. 8-12, 2021, Virtual Event, Israel (Year: 2021).*

Li, Diya, et al, "Food Knowledge Representation Learning with Adversarial Substitution," 2022, Computer Science Department, Rensselaer Polytechnic Institute (Year: 2022).*

Shirai, Sola, et al, "Identifying Ingredient Substitutions Using a Knowledge Graph of Food," Jan. 25, 2021, Front. Artif. Intell., Sec. AI in Food, Agriculture and Water (Year: 2021).*

\* cited by examiner

REPLACING ONE OR MORE GENERIC ITEM DESCRIPTIONS IN A RECIPE TO ACCOMMODATE USER PREFERENCES FOR ITEMS BASED ON DETERMINED RELATIONSHIPS BETWEEN GENERIC ITEM DESCRIPTIONS

BACKGROUND

This disclosure relates generally to displaying recipes obtained by an online concierge system to a user, and more specifically to the online concierge system replacing one or more generic item descriptions in a recipe with replacement generic item descriptions based on one or more preferences of the user.

In current online concierge systems, shoppers (or "pickers") fulfill orders at a physical warehouse, such as a retailer, on behalf of customers as part of an online shopping concierge service. An online concierge system provides an interface to a customer identifying items offered by a physical warehouse and receives selections of one or more items for an order from the customer. In current online concierge systems, the shoppers may be sent to various warehouses with instructions to fulfill orders for items, and the shoppers then find the items included in the customer order in a warehouse.

To simplify selection of items for inclusion in an order, an online concierge system may maintain various recipes, with recipe including one or more items. A user of the online concierge system may review a recipe and add items from the recipe to an order through the online concierge system, simplifying selection of items for inclusion in an order. A conventional online concierge system allows a user to browse recipes obtained by the online concierge system. For example, a user may provide a search query to an online concierge system, which returns one or more recipes satisfying the search query. In other examples, an online concierge system identifies recipes to a user based on recipes the user previously accessed or items that the user previously purchased.

However, many users have preferences or dietary restrictions that render certain items in a recipe unsuitable for the user. Many conventional online concierge systems address these user preferences by excluding display of recipes including items that are inconsistent with user preferences or dietary restrictions or by displaying an indication in conjunction with a recipe that the recipe includes one or more items incompatible with the user's preferences or dietary restrictions. While these approaches account for the user's preferences or dietary restrictions when displaying recipes to the user, they may reduce a number of recipes displayed to the user or discourage users from selecting or from interacting with certain recipes. Additionally, certain items in a recipe are capable of being replaced by alternative items that are consistent with a user's preferences or dietary restrictions, but conventional online concierge systems rely on users being aware of relationships between items and other items consistent with their preferences or dietary restrictions and replacing items in recipes based on those relationships. This increased complexity in identifying recipes or making recipes consistent with preferences or dietary restrictions can reduce user interaction with recipes identified by an online concierge system or interaction with the online concierge system by users as a whole.

SUMMARY

The online concierge system obtains recipes from one or more sources. Example sources include a warehouse or a third party system (e.g., a website) exchanging information with the online concierge system. Each recipe includes one or more items, or a plurality of items. A recipe may include a quantity corresponding to each item included in the recipe. Additionally, a recipe may include instructions for combining items included in the recipe. In various embodiments, a recipe includes a title, a description, generic item descriptions, and quantities for each of the one or more generic item descriptions included in the recipe. For example, a recipe includes a generic item description of "milk" rather than a specific item identifier that specifies a brand or specific attributes of milk, allowing the recipe to more broadly identify ingredients, allowing the recipe to be applicable to warehouses offering different items.

The online concierge system also obtains replacement information for one or more generic item descriptions. Replacement information for a generic item description identifies a replacement generic item description capable of replacing the generic item description and a replacement quantity of the replacement generic item description for replacing a quantity of the generic item description. Additionally, replacement information for a generic item description identifies one or more preferences of a user that, when included in information, cause the generic item description to be replaced by the replacement generic item description. In some embodiments, replacement information also includes one or more recipe types, with a recipe type indicating a recipe type in which the generic item description is capable of being replaced by the replacement generic item description; however, in alternative embodiments, a recipe type indicates a recipe type in which the generic item description is not capable of being replaced by the replacement generic item description.

The online concierge system obtains replacement information for an item through application of one or more natural language processing methods to recipes and other sources describing information or characteristics of food. This allows the online concierge system to leverage information available from sources to generate the replacement information. The online concierge system may alternatively or additionally receive inputs from users that identify replacement information for generic item descriptions, allowing one or more users to manually provide information to the online concierge system describing replacement of one or more generic item descriptions with one or more corresponding replacement generic item descriptions.

From the obtained replacement information, the online concierge system generates a replacement graph identifying relationships between generic item descriptions. The replacement graph includes nodes that each correspond to a generic item description and directional edges between pairs of nodes. A directional edge is from a generic item description to a replacement generic item description and indicates that the generic item description is capable of being replaced by the replacement generic item description. The directional edge between the generic item description and the replacement generic item description includes a replacement quantity that specifies an amount of the replacement generic item description used to replace a quantity of the generic item description. The directional edge also includes one or more preferences that, when included in information describing a user, causes the online concierge system to replace the generic item description and its corresponding quantity in a recipe with the replacement generic item description and an alternative quantity determined from the replacement quantity when the recipe is displayed to the user. Additionally, the directional edge may include one or more recipe types that indicate recipe types in which the replacement generic item description is capable of replacing the generic item description or that indicate recipe types in which the replacement generic item description is not capable of replacing the generic item. The online concierge system may generate the replacement graph through application of one or more models to the replacement information in some embodiments or through manual input identifying the nodes and edges in the replacement graph with their corresponding attributes.

After generating the replacement graph, the online concierge systems elects a recipe for a user. In some embodiments, the online concierge system receives a selection of the recipe from the user. For example, the user selects a title, image, or description of a recipe displayed to the user by online concierge system. As another example, the online concierge system selects a recipe for display to the user based on prior user interactions with recipes by the online concierge system or based on items included in one or more prior orders received from the user.

The online concierge system identifies generic item descriptions included in the selected recipe and retrieves preferences stored in association with the user. The online concierge system identifies the generic item descriptions in the selected through any suitable method. For example, the online concierge system 102 applies one or more natural language processing methods, such as named entity recognition, to recipes obtained 505 by the online concierge system.

Preferences stored in association with the user may be manually specified by the user in some embodiments. For example, the online concierge system displays one or more prompts to the user requesting identification of preferences from the user and the user inputs the one or more preferences in response to the one or more prompts. As an example, a prompt asks the user whether the user is a vegetarian, while another prompt asks the user whether the user is vegan. In another example, a prompt requests the user identify or select attributes of items, such as dietary characteristics, of items of interest to the user. The online concierge system stores the inputs received from the user as preferences in association with an identifier of the user.

Alternatively or additionally, the online concierge system determines one or more preferences for the user based on items included in orders previously received from the user. In some embodiment, the online concierge retrieves prior orders received from the user during a specific time interval, such as within a threshold duration from a time when the recipe was selected for the user. For example, the online concierge system retrieves prior orders received from the user and identifies items included in the retrieved prior orders. The online concierge system determines attributes of the identified items and determines one or more preferences of the user as attributes of items included in a threshold percentage of the prior orders or as attributes of items included in the prior orders with at least a threshold rate or a threshold frequency. The online concierge system stores the one or more preferences determined from the prior orders of the user in association with an identifier of the user, as further described above. Hence, the online concierge system leverages items the user has previously purchased to determine one or more preferences of the user from the user's purchase history.

From the preferences stored in association with the user and the replacement graph, the online concierge system determines a replacement generic item description for a generic item description included in the selected recipe. In various embodiments, the online concierge system compares a generic item description identified in the selected recipe to nodes in the replacement graph. In response to identifying the generic item description in the replacement graph, the online concierge system determines whether a directed edge from the generic item description to a replacement generic item description has a preference matching a preference stored in association with the user. In response to the directed edge from the generic item description to the replacement generic item description having a preference matching the preference stored in association with the user, the online concierge system determines to replace the generic item description in the selected recipe with the replacement generic item description connected to the generic item description via the directed edge in the replacement graph. In response to the directed edge from the generic item description to the replacement generic item description not having a preference matching the preference stored in association with the user, the online concierge system does not replace the generic item description in the selected recipe with the replacement generic item description connected to the generic item description via the directed edge in the replacement graph. This allows the online concierge system 102 to condition replacement of the generic item description included in the selected recipe on the replacement graph having a directed edge from the generic item description to the replacement generic item description having a preference matching a user preference, allowing the replacement of the generic item description in the selected recipe to account for the preferences stored in association with the user.

If the directed edge between the generic item description included in the recipe includes one or more recipe types, the online concierge system compares the recipe type of the selected recipe to the one or more recipe types included in the directed edge. In some embodiments, the online concierge system determines to replace the generic item description in the selected recipe with the replacement generic item description in response to the directed edge from the generic item description to the replacement generic item description having a preference matching a user preference and having a recipe type matching a recipe type included in the directed edge. Alternatively, the online concierge system determines to replace the generic item description in the selected recipe with the replacement generic item description in response to the directed edge from the generic item description to the replacement generic item description having a preference matching a user preference and not having a recipe type matching a recipe type included in the directed edge. This allows the online concierge system to account for a likely significance of the generic item description included in the selected recipe to the selected recipe, preventing the online concierge system from replacing a generic item description that would prevent the recipe from being successfully completed by the user because of the replacement of the generic item description.

In some embodiments, the replacement graph stores tags associated with generic item descriptions indicating whether a generic item description satisfies a preference. For example, a node corresponding to the generic item description includes a tag identifying a preference in response to the generic item description satisfying the preference. Alternatively, a node corresponding to the generic item description includes a vector for the generic item description having multiple dimensions with a dimension of the vector corresponding to a degree to which the generic item description satisfies a preference corresponding to the dimension. For a generic item description included in the selected recipe, the online concierge system 102 determines whether the generic item description satisfies a preference stored in association with the user based on the vector or the tags associated with the generic item description in the replacement graph. In response to determining the generic item description does not satisfy the preference stored in association with the user, the online concierge system determines a replacement generic item description that satisfies the preference stored in association with the user as further described above. However, in response to determining the generic item description does satisfies the preference stored in association with the user, the online concierge system does not determine a replacement generic item description for the item.

In response to determining to replace the generic item description in the selected recipe with the replacement generic item description connected to the generic item description via the directed edge in the replacement graph, the online concierge system 102 modifies 530 the selected recipe by replacing the generic item description with the replacement generic item description. To maintain accuracy of the combination of generic item descriptions and their corresponding amounts, when modifying the selected recipe, the online concierge system replaces a quantity of the generic item description specified by the selected recipe with an alternative quantity of the replacement generic item description, with the alternative quantity determined from the quantity of the generic item description specified by the selected recipe and the replacement quantity for the replacement generic item description included in the replacement graph. For example, the online concierge system 102 determines the alternative quantity so a ratio of the alternative quantity of the replacement generic item description to the quantity of the generic item description specified by the selected recipe equals a ratio of the replacement quantity of the replacement generic item description to a quantity of the generic item description identified by the replacement graph. Hence, the online concierge system modifies the selected recipe by replacing the generic item description and the quantity of the generic item description with the replacement generic item description and the alternative quantity of the replacement generic item description determined from the replacement graph.

When modifying the selected recipe, the online concierge system includes instructions for visually distinguishing the replacement generic item description and the alternative quantity from generic item descriptions originally included in the selected recipe. For example, the replacement generic item description and the alternative quantity are displayed in a different color or in a different font than the generic item descriptions originally included in the selected recipe. Additionally or alternatively, the modified selected recipe includes instructions that, when executed by a client device displaying the modified selected recipe, cause the client device to display a selectable interface element (e.g., a radio button, a slider) proximate to the replacement generic item description along with a prompt to reverse the replacement of the generic item description with the replacement generic item description. In response to receiving a specific interaction with the selectable interface element via the client device, the online concierge system replaces the replacement generic item description and its alternative quantity with the generic item description and the corresponding quantity of the generic item description from the selected recipe. Hence, the user may reverse the replacement of the generic item description with the replacement generic item description by interacting with the selectable interface element. In some embodiments, the online concierge system 102 modifies the name of the selected recipe to provide an indication that one or more generic item descriptions in the recipe have been replaced by corresponding replacement generic item descriptions. For example, the online concierge system appends a preference included in a directed edge from a generic item description included in the selected recipe to a replacement generic item description to indicate to the user that the selected recipe has been modified 530. The online concierge system transmits the modified selected recipe to a client device of the user for display.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
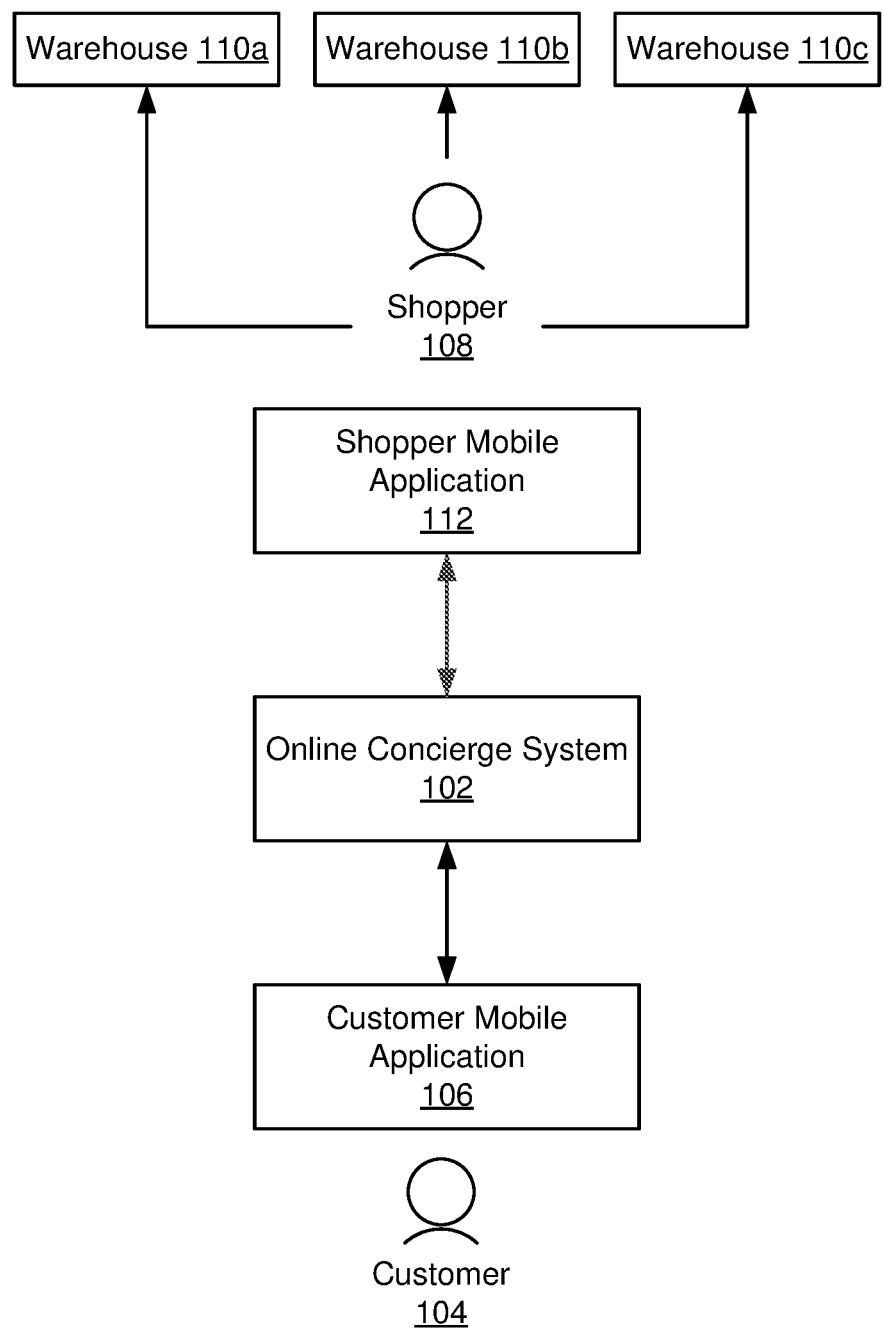
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more shoppers 108. A shopper 108 may be a contractor, employee, or other person (or entity) who is enabled to fulfill orders received by the online concierge system 102. The shopper 108 travels between a warehouse and a delivery location (e.g., the customer's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each shopper 108 fulfills an order received from the online concierge system 102 at one or more warehouses 110, delivers the order to the customer 104, or performs both fulfillment and delivery. In one embodiment, shoppers 108 make use of a shopper mobile application 112 which is configured to interact with the online concierge system 102.

Figure 2:
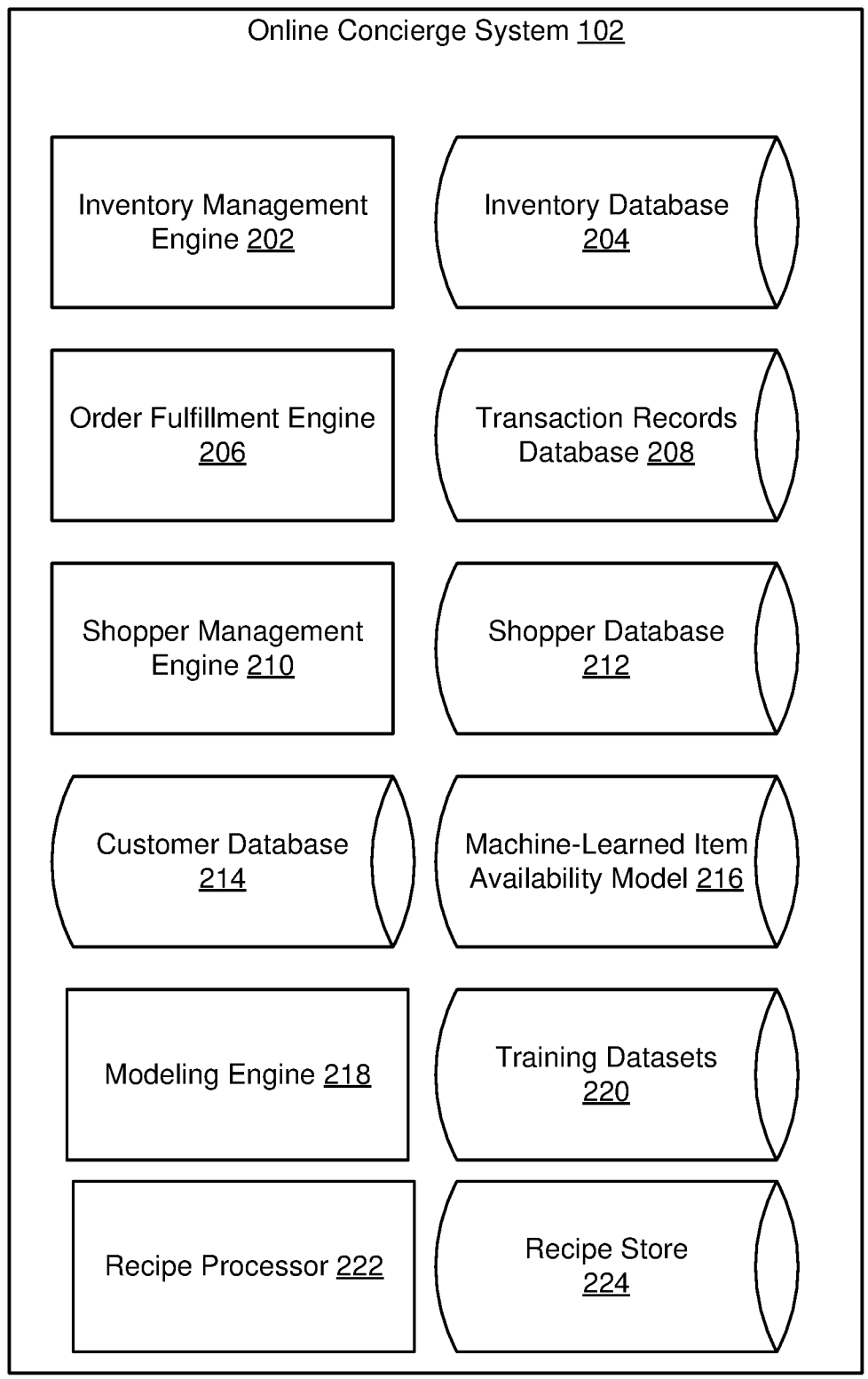
FIG. 2 is a diagram of an online shopping concierge system, according to one embodiment.

FIG. 2 is a diagram of an online concierge system 102, according to one embodiment. In various embodiments, the online concierge system 102 includes fewer components than those described in conjunction with FIG. 2. In other embodiments, the online concierge system 102 includes different or additional components than those described in conjunction with FIG. 2.

The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

In various embodiments, the inventory management engine 202 maintains a taxonomy of items offered for purchase by one or more warehouses 110. For example, the inventory management engine 202 receives an item catalog from a warehouse 110 identifying items offered for purchase by the warehouse 110. From the item catalog, the inventory management engine 202 determines a taxonomy of items offered by the warehouse 110. Different levels in the taxonomy providing different levels of specificity about items included in the levels. For example, the taxonomy includes different categories for items, with categories in different levels of the taxonomy providing different levels of specificity for categories, with lower levels in the hierarchy corresponding to more specific categories, and a lowest level of the hierarchy identifying different specific items. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse 110 marching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse 110 in various embodiments. In other embodiments, the inventory management engine 202 applies a trained classification module to an item catalog received from a warehouse 110 to include different items in levels of the taxonomy, so application of the trained classification model associates specific items with generic item descriptions corresponding to levels within the taxonomy.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a customer 104. Prices set by the order fulfillment engine 206 may or may not be identical to in-store prices determined by retailers (which is the price that customers 104 and shoppers 108 would pay at the retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the customer 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a customer database 214 which stores information describing each customer. This information could include each customer's name, address, gender, shopping preferences, favorite items, stored payment instruments, and so on.

In some embodiments, the order fulfillment engine 206 generates one or more recommendations to a user from whom an order is received based on items included in the order. As further described below in conjunction with FIGS. 4 and 5, the order fulfillment engine 206 generates an order vector for a received order based on items included in the order, so different dimensions of the order correspond to different items included in the order. The order fulfillment engine 206 determines similarities between the order vector and recipe vectors corresponding to recipes obtained by the online concierge system 102. Recipe vectors are further described below in conjunction with FIG. 4. A similarity between the order vector and the recipe vector is based on an amount of items included in both the order vector and the recipe vector; hence, the similarity provides a measure of overlap between items in the order and items in the recipe corresponding to the recipe vector. Based on the similarities, the order fulfillment engine 206 selects one or more recipes and transmits a notification identifying a selected recipe to a client device for display to the user, as further described below in conjunction with FIGS. 4 and 5.

Machine Learning Model

The online concierge system 102 further includes a machine-learned item availability model 216, a modeling engine 218, training datasets 220, a recipe processor 222, and a recipe store 224. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110, also referred to as a predicted availability of the item at the warehouse 110. The machine-learned item availability model 216 may be used to predict item availability for items being displayed to or selected by a customer or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the customer 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 generates recipe vectors for recipes obtained by the online concierge system 102. In various embodiments, the modeling engine 218 identifies each item included in the recipe, so a dimension of the recipe vector corresponds to an item included in the recipe. The recipe vector may also include an importance score for each item included in the recipe, so each dimension of the recipe vector identifies an item included in the item and the importance score for the item. The importance score for an item is a term frequency-inverse document frequency (TF-IDF) value for the item in various embodiments. For example, the modeling engine 218 determines a product of a term frequency of the item in a recipe and an inverse document frequency of the term across a set of recipes. In some embodiments, the set of recipes comprises all recipes obtained by the online concierge system 102. Higher importance scores indicate an item has higher relevance to a recipe, while lower importance scores indicate the item has a lower relevance to the recipe.

The recipe processor 222 obtains recipes from one or more sources. A recipe includes one or more items, such as a plurality of items, a quantity of each item, and may also include information describing how to combine the items in the recipe. Recipes may be obtained from users, third party systems (e.g., websites, applications), or any other suitable source and stored in the recipe store 224. Additionally, each recipe has one or more attributes describing the recipe. Example attributes of a recipe include an amount of time to prepare the recipe, a complexity of the recipe, nutritional information about the recipe, a genre of the recipe, or any other suitable information. Attributes of a recipe may be included in the recipe by a source from which the recipe was received or may be determined by the online concierge system 102 from items in the recipe or other information included in the recipe.

To account for preferences or dietary restrictions of users, the recipe processor 222 generates a replacement graph that identifies relationships between generic item descriptions and replacement generic item descriptions. In the replacement graph, a node corresponds to a generic item description and a directional edge connects the node to a replacement node. The directional edge between the node and the replacement node indicates the generic item description corresponding to the node can be replaced by a replacement generic item description corresponding to the node. The directional edge also includes a replacement quantity that identifies a relative quantity of the replacement generic item description to replace the generic item description. Additionally, the directional edge includes one or more tags corresponding to a preference when the generic item description is replaced by the replacement quantity of the replacement generic item description. The recipe processor 222 generates the replacement graph by analyzing recipes from various sources as well as other sources describing relationships between items or generic item descriptions. Example sources describing relationships between items or generic item descriptions include articles about food or relationships between food, recipes maintained by various sources, or any other suitable source accessible by the online concierge system 102 including content describing relationships between items or between generic item descriptions. In various embodiments, the recipe processor 222 applies one or more natural language processes to recipes or other documents obtained from one or more sources to extract generic item descriptions from the recipes and other documents. For example, the recipe processor 222 applies one or more named entity recognition methods to recipes and other documents obtained from one or more sources to identify generic item descriptions included in recipes and quantities of different generic item descriptions in recipes. From the extracted generic item descriptions and quantities for generic item descriptions, the recipe processor 222 determines relationships between generic item descriptions and replacement generic item descriptions and generates the replacement graph though any suitable method or methods.

Figure 4:
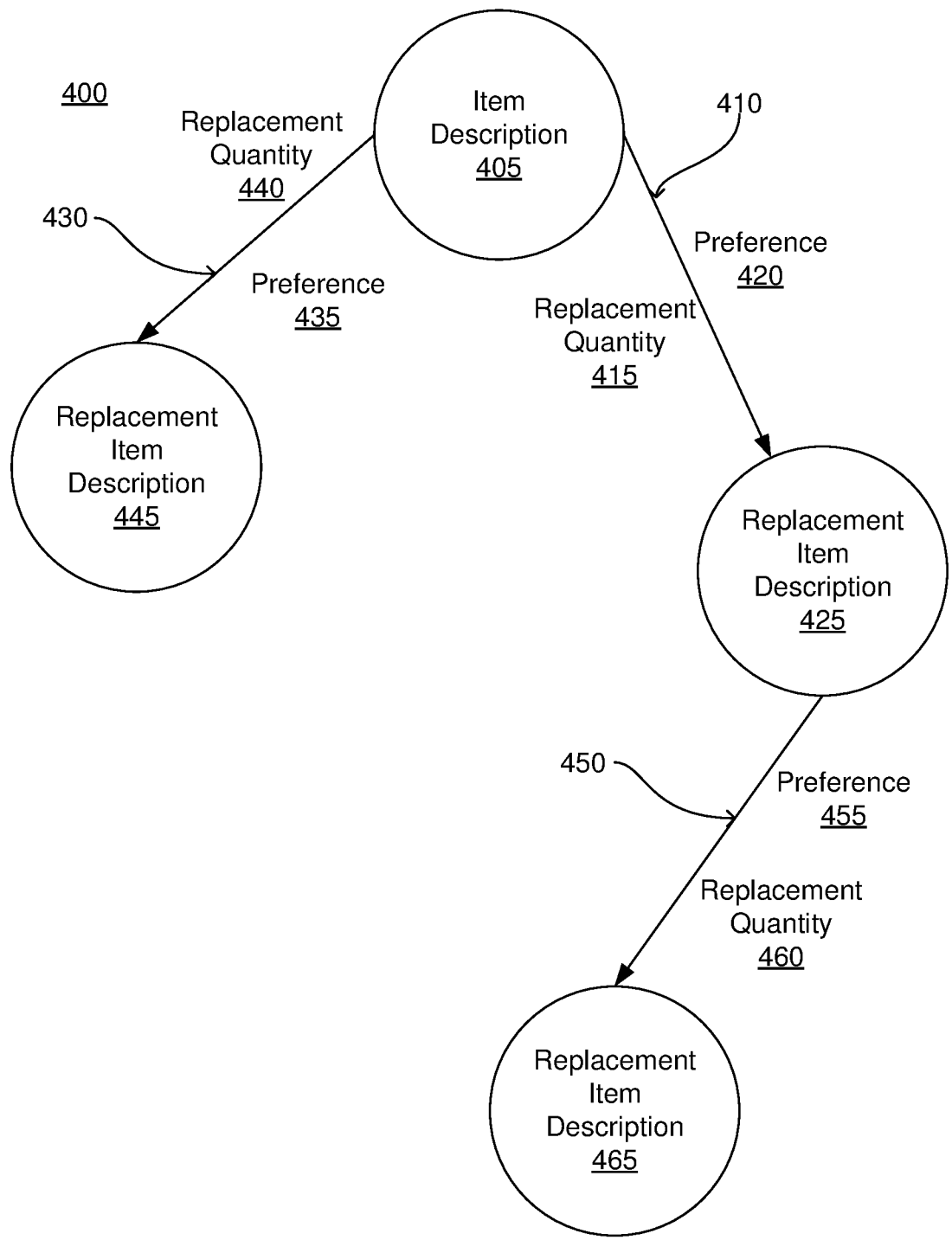
FIG. 4 is an example replacement graph identifying relationships between generic item descriptions, according to one embodiment.

FIG. 4 shows an example replacement graph 400 generated by the recipe processor 222. For purposes of illustration, FIG. 4 includes a node corresponding to a generic item description 405. From information extracted from recipes and one or more other sources, the recipe processor 222 determined that replacement generic item description 425 is capable of being substituted for generic item description 405, so the replacement graph 400 includes a directional edge 410 from the node corresponding to the generic item description 405 to a replacement node corresponding to replacement generic item description 425. The directional edge 410 stores a replacement quantity 415 for replacement generic item description 425 indicating a relative amount of replacement generic item description 425 for replacing an amount of the generic item description 405. In some embodiments, the replacement quantity 415 is specified relative to a specific quantity of the generic item description 405 (e.g., a specific weight of the generic item description 405, a specific volume of the generic item description 405, a specific number of the generic item description 405, etc.). Hence, the directional edge 410 indicates that the generic item description 405 is capable of being replaced by replacement generic item description 425, with the directional edge 410 also specifying the replacement quantity 415 of replacement generic item description 425 to replace a quantity of the generic item description 405.

In various embodiments, the directional edge 410 also includes one or more tags, with each tag identifying a preference 420 of a user that, when identified by the online concierge system 102, causes the online concierge system 102 to replace the generic item description 405 with replacement generic item description 425. For example, a preference 420 identifies a dietary preference of a user where replacing the generic item description 405 with replacement generic item description 425 satisfies or is consistent with the dietary preference. Hence, when a preference 420 included in the directional edge 410 is identified for a user, the online concierge system 102 replaces the generic item description 405 with replacement generic item description 425. While FIG. 4 shows a single preference 420 included in the directional edge 410, any suitable number of preferences 420 may be included in the directional edge 410.

The directional edge 410 may also include one or more recipe type identifiers. In some embodiments, a recipe type identifier indicates a recipe type in which the generic item description 405 is capable of being replaced by replacement generic item description 425. Hence, if a recipe including the generic item description 405 has a recipe type that is not included in the directional edge 410, the generic item description 405 is not replaced by replacement generic item description 425. Alternatively, the recipe type identifier included in the directional edge 410 identifies a recipe type for which the generic item description 405 is incapable of being replaced by replacement item identifier 425. In such embodiments, the generic item description 405 is not replaced by replacement item identifier 425 when the generic item description 405 is included in a recipe having a recipe type included in the directional edge 410.

Similarly, replacement graph 400 includes a directed edge 430 from the node corresponding to the generic item description 405 to a node corresponding to replacement generic item description 445, indicating that the generic item description 405 is capable of being replaced by replacement generic item description 445. The directed edge 430 also includes one or more tags each corresponding to a preference 435 that, when identified for a user, causes the online concierge system 102 to replace the generic item description 405 with replacement generic item description 445, as further described above. The directed edge 430 includes a replacement quantity 440 identifying an amount of replacement generic item description 445 to replace an amount of the generic item description 405. In some embodiments, the directed edge 430 may include one or more recipe types, as further described above, to limit types of recipes for which replacement generic item description 445 replaces the generic item description 405.

In the example of FIG. 4, replacement graph 400 includes a directed edge 450 from the node corresponding to replacement generic item description 425 to a node corresponding to replacement generic item description 465, indicating that replacement generic item description 425 is capable of being replaced by replacement generic item description 465. The directed edge 450 shown in FIG. 4 includes one or more preferences 455 identifying one or more characteristics of users that, when identified for a user, cause the online concierge system 102 to replace replacement generic item description 425 with replacement generic item description 465, as further described above. Similarly, the directed edge 450 includes a replacement quantity 460 identifying an amount of replacement generic item description 465 to replace an amount of replacement generic item description 465. In some embodiments, the directed edge 450 may include one or more recipe types, as further described above, to limit types of recipes for which replacement generic item description 465 replaces replacement generic item description 465.

Referring back to FIG. 2, the recipe store 224 includes information identifying recipes obtained by the online concierge system 102. A recipe includes one or more items, such as a plurality of items, a quantity of each item, and may also include information describing how to combine the items in the recipe. Recipes may be obtained from users, third party systems (e.g., websites, applications), or any other suitable source and stored in the recipe store 224. Additionally, each recipe has one or more attributes describing the recipe. Example attributes of a recipe include an amount of time to prepare the recipe, a complexity of the recipe, nutritional information about the recipe, a genre of the recipe, or any other suitable information. Attributes of a recipe may be included in the recipe by a source from which the recipe was received or may be determined by the online concierge system 102 from items in the recipe or other information included in the recipe.

Additionally, the recipe store 224 maintains a recipe graph identifying connections between recipes in the recipe store 224. A connection between a recipe and another recipe indicates that the connected recipes each have one or more common attributes. In some embodiments, a connection between a recipe and another recipe indicates that a user included items from each connected recipe in a common order or included items from each connected recipe in orders the online concierge system received from the user within a threshold amount of time from each other. In various embodiments, each connection between recipes includes a value, with the value providing an indication of a strength of a connection between the recipes.

In various embodiments, the recipe store 224 stores the replacement graph generated by the recipe processor 222 and further described above in conjunction with FIG. 4. The replacement graph allows the online concierge system 102 to maintain relationships between generic item descriptions that identify preferences of a user causing replacement of a generic item description with a replacement generic item description, as well as a quantity of the replacement generic item description used to replace the generic item description. This allows the online concierge system 102 to modify a recipe for display to a user by replacing one or more generic item descriptions in the recipe with corresponding replacement generic item descriptions based on the replacement graph and corresponding quantities of the replacement generic item descriptions, as further described below in conjunction with FIG. 5. Such modification of a recipe with replacement generic item descriptions allows the online concierge system 102 to leverage information about the user and relationships between generic item descriptions to initially display a recipe personalized to the user based on the user's preferences, increasing a likelihood of the user interacting with the displayed recipe.

Further, for various recipes, the recipe store 224 maintains associations between generic item descriptions included in the recipe and specific items offered by different warehouses 110. In some embodiments, the recipe store 224 associates a combination of a warehouse 110 and a specific item offered by the warehouse 110 with a generic item description included in the recipe. However, in other embodiments, the recipe store 224 stores an association between a warehouse 110, a specific item offered by the warehouse 110, a recipe, and a generic item description included in the recipe in any suitable format. The recipe store 224 receives associations between generic item descriptions in a recipe, a warehouse 110, and an item offered by the warehouse 110 from the recipe processor 222. Storing associations between warehouses 110, a specific items offered by the warehouses 110, a recipes, and generic item descriptions included in the recipes in the recipe store 224 allows the online concierge system 102 to more efficiently retrieve specific items offered by a warehouse 110 for a recipe displayed to a user.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others, or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability, and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
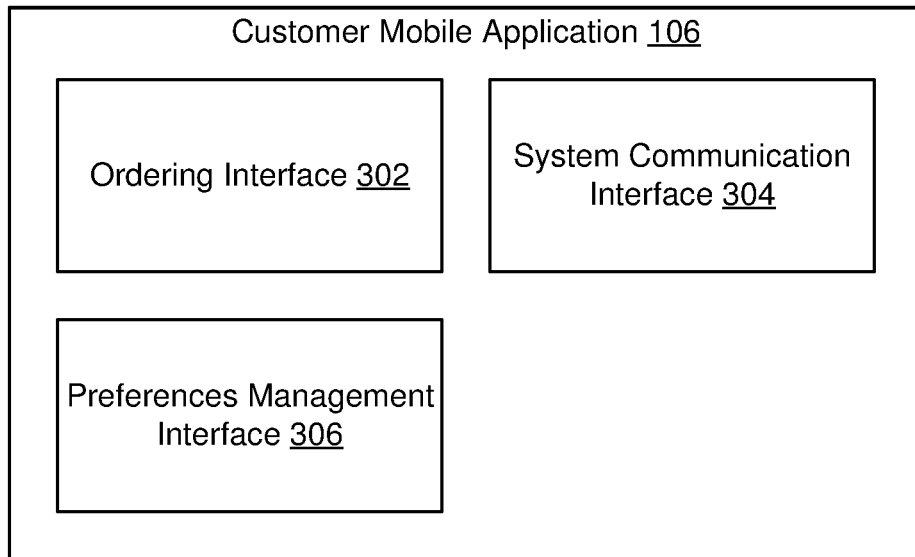
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred warehouses 110, preferred delivery times, special instructions for delivery, and so on.

Shopper Mobile Application

Figure 3B:
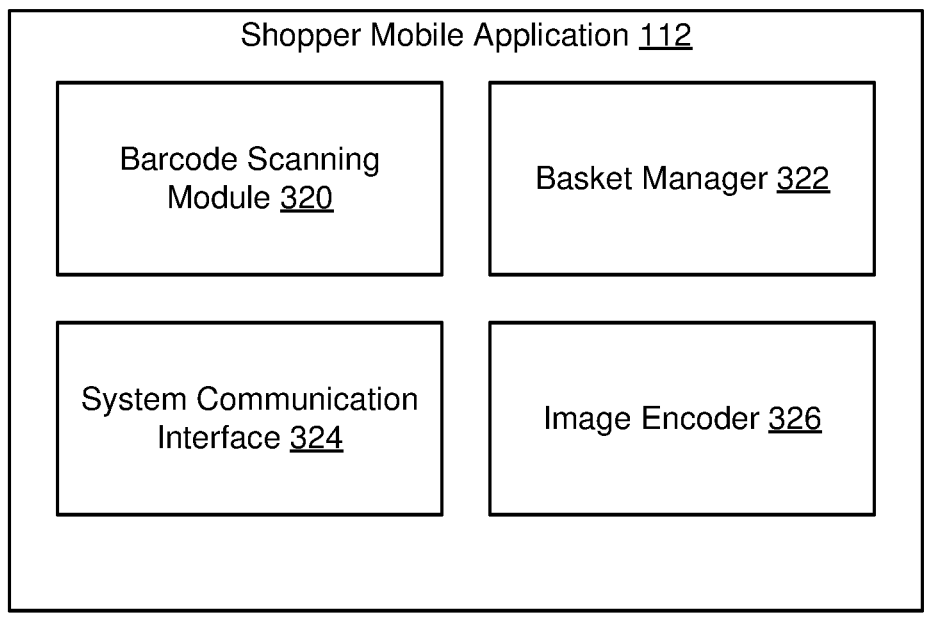
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Figure 5:
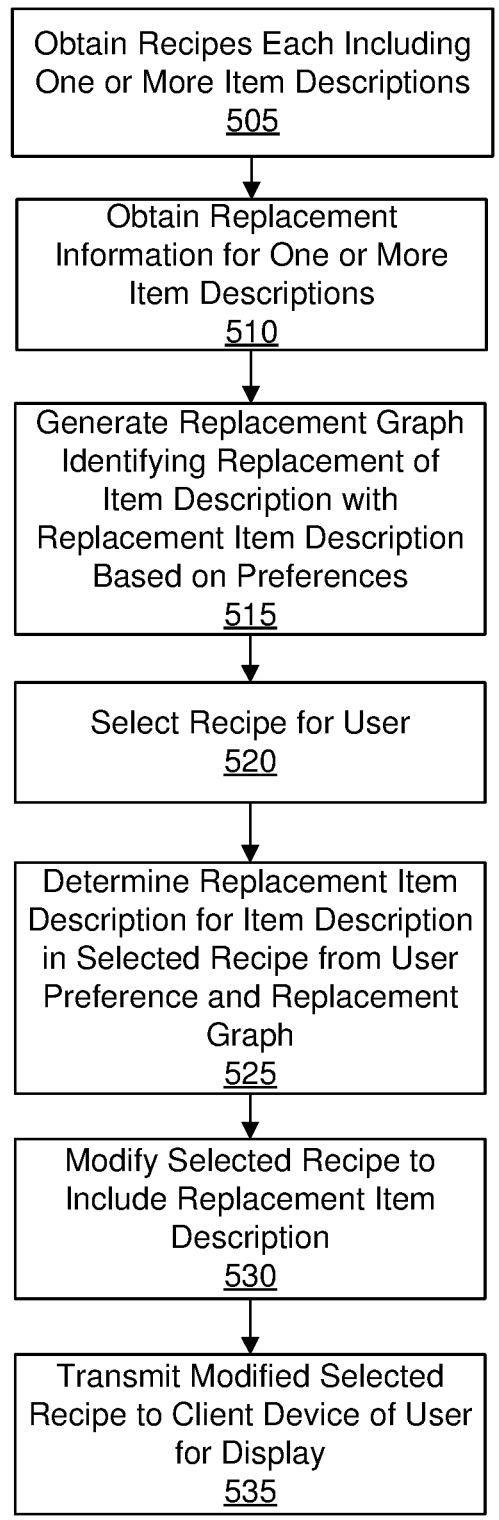
FIG. 5 is a flowchart illustrating a process for modifying a recipe for a user by replacing one or more generic item descriptions in the recipe with replacement generic item descriptions based on one or more preferences of the user, according to one embodiment.

Generating Modified Recipes Including Alternative Generic Item Descriptions Based on User Preferences FIG. 5 is a flowchart of one embodiment of a method for modifying one or more generic item descriptions in a recipe based on preferences of a user to whom the recipe is displayed. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments. While FIG. 5 describes an example operation of the method by an online concierge system 102, the method described in conjunction with FIG. 5 may be performed by another type of online system configured to retrieve recipes and display recipes to users.

The online concierge system 102 obtains 505 recipes from one or more sources. Example sources include a warehouse 110 or a third party system (e.g., a website) exchanging information with the online concierge system 102. Each recipe includes one or more items, or a plurality of items. A recipe may include a quantity corresponding to each item included in the recipe. Additionally, a recipe may include instructions for combining items included in the recipe. In various embodiments, a recipe includes a title, a description, generic item descriptions, and quantities for each of the one or more generic item descriptions included in the recipe. For example, a recipe includes a generic item description of "milk" rather than a specific item identifier that specifies a brand or specific attributes of milk, allowing the recipe to more broadly identify ingredients, allowing the recipe to be applicable to warehouses 110 offering different items.

The online concierge system 102 also obtains 510 replacement information for one or more generic item descriptions. Replacement information for a generic item description identifies a replacement generic item description capable of replacing the generic item description and a replacement quantity of the replacement generic item description for replacing a quantity of the generic item description. Additionally, replacement information for a generic item description identifies one or more preferences of a user that, when included in information, cause the generic item description to be replaced by the replacement generic item description. In some embodiments, replacement information also includes one or more recipe types, with a recipe type indicating a recipe type in which the generic item description is capable of being replaced by the replacement generic item description; however, in alternative embodiments, a recipe type indicates a recipe type in which the generic item description is not capable of being replaced by the replacement generic item description.

The online concierge system 102 obtains 510 replacement information for an item through application of one or more natural language processing methods to recipes and other sources describing information or characteristics of food. This allows the online concierge 102 system to leverage information available from sources to generate the replacement information. The online concierge system 102 may alternatively or additionally receive inputs from users that identify replacement information for generic item descriptions, allowing one or more users to manually provide information to the online concierge system 102 describing replacement of one or more generic item descriptions with one or more corresponding replacement generic item descriptions.

From the obtained replacement information, the online concierge system 102 generates 515 a replacement graph identifying relationships between generic item descriptions. As further described above in conjunction with FIG. 4, the replacement graph includes nodes that each correspond to a generic item description and directional edges between pairs of nodes. A directional edge is from a generic item description to a replacement generic item description and indicates that the generic item description is capable of being replaced by the replacement generic item description. As further described above in conjunction with FIG. 4, the directional edge between the generic item description and the replacement generic item description includes a replacement quantity that specifies an amount of the replacement generic item description used to replace a quantity of the generic item description. The directional edge also includes one or more preferences that, when included in information describing a user, causes the online concierge system 102 to replace the generic item description and its corresponding quantity in a recipe with the replacement generic item description and an alternative quantity determined from the replacement quantity when the recipe is displayed to the user. Additionally, the directional edge may include one or more recipe types that indicate recipe types in which the replacement generic item description is capable of replacing the generic item description or that indicate recipe types in which the replacement generic item description is not capable of replacing the generic item. The online concierge system 102 may generate 515 the replacement graph through application of one or more models to the replacement information in some embodiments or through manual input identifying the nodes and edges in the replacement graph with their corresponding attributes. The replacement graph is stored by the online concierge system 102, such as in the recipe store 224.

After generating 515 the replacement graph, the online concierge system 102 selects 520 a recipe for a user. In some embodiments, the online concierge system 102 receives a selection of the recipe from the user. For example, the user selects a title, image, or description of a recipe displayed to the user by online concierge system 102. As another example, the online concierge system 102 selects 520 a recipe for display to the user based on prior user interactions with recipes by the online concierge system or based on items included in one or more prior orders received from the user.

The online concierge system 102 identifies generic item descriptions included in the selected recipe and retrieves preferences stored in association with the user. The online concierge system 102 identifies the generic item descriptions in the selected through any suitable method. For example, the online concierge system 102 applies one or more natural language processing methods, such as named entity recognition, to recipes obtained 505 by the online concierge system 102.

Preferences stored in association with the user may be manually specified by the user in some embodiments. For example, the online concierge system 102 displays one or more prompts to the user requesting identification of preferences from the user and the user inputs the one or more preferences in response to the one or more prompts. As an example, a prompt asks the user whether the user is a vegetarian, while another prompt asks the user whether the user is vegan. In another example, a prompt requests the user identify or select attributes of items, such as dietary characteristics, of items of interest to the user. The online concierge system 102 stores the inputs received from the user as preferences in association with an identifier of the user.

Alternatively or additionally, the online concierge system 102 determines one or more preferences for the user based on items included in orders previously received from the user. In some embodiment, the online concierge 102 retrieves prior orders received from the user during a specific time interval, such as within a threshold duration from a time when the recipe was selected 520 for the user. For example, the online concierge system 102 retrieves prior orders received from the user and identifies items included in the retrieved prior orders. The online concierge system 102 determines attributes of the identified items and determines one or more preferences of the user as attributes of items included in a threshold percentage of the prior orders or as attributes of items included in the prior orders with at least a threshold rate or a threshold frequency. The online concierge system 102 stores the one or more preferences determined from the prior orders of the user in association with an identifier of the user, as further described above. Hence, the online concierge system 102 leverages items the user has previously purchased to determine one or more preferences of the user from the user's purchase history.

From the preferences stored in association with the user and the replacement graph, the online concierge system 102 determines 525 a replacement generic item description for a generic item description included in the selected recipe. In various embodiments, the online concierge system 102 compares a generic item description identified in the selected recipe to nodes in the replacement graph. In response to identifying the generic item description in the replacement graph, the online concierge system 102 determines whether a directed edge from the generic item description to a replacement generic item description has a preference matching a preference stored in association with the user. In response to the directed edge from the generic item description to the replacement generic item description having a preference matching the preference stored in association with the user, the online concierge system 102 determines 525 to replace the generic item description in the selected recipe with the replacement generic item description connected to the generic item description via the directed edge in the replacement graph. In response to the directed edge from the generic item description to the replacement generic item description not having a preference matching the preference stored in association with the user, the online concierge system 102 does not replace the generic item description in the selected recipe with the replacement generic item description connected to the generic item description via the directed edge in the replacement graph. This allows the online concierge system 102 to condition replacement of the generic item description included in the selected recipe on the replacement graph having a directed edge from the generic item description to the replacement generic item description having a preference matching a user preference, allowing the replacement of the generic item description in the selected recipe to account for the preferences stored in association with the user.

If the directed edge between the generic item description included in the recipe includes one or more recipe types, the online concierge system 102 compares the recipe type of the selected recipe to the one or more recipe types included in the directed edge. In some embodiments, the online concierge system 102 determines 525 to replace the generic item description in the selected recipe with the replacement generic item description in response to the directed edge from the generic item description to the replacement generic item description having a preference matching a user preference and having a recipe type matching a recipe type included in the directed edge. Alternatively, the online concierge system 102 determines 525 to replace the generic item description in the selected recipe with the replacement generic item description in response to the directed edge from the generic item description to the replacement generic item description having a preference matching a user preference and not having a recipe type matching a recipe type included in the directed edge. This allows the online concierge system 102 to account for a likely significance of the generic item description included in the selected recipe to the selected recipe, preventing the online concierge system 102 from replacing a generic item description that would prevent the recipe from being successfully completed by the user because of the replacement of the generic item description.

In some embodiments, the replacement graph stores tags associated with generic item descriptions indicating whether a generic item description satisfies a preference. For example, a node corresponding to the generic item description includes a tag identifying a preference in response to the generic item description satisfying the preference. Alternatively, a node corresponding to the generic item description includes a vector for the generic item description having multiple dimensions with a dimension of the vector corresponding to a degree to which the generic item description satisfies a preference corresponding to the dimension. For a generic item description included in the selected recipe, the online concierge system 102 determines whether the generic item description satisfies a preference stored in association with the user based on the vector or the tags associated with the generic item description in the replacement graph. In response to determining the generic item description does not satisfy the preference stored in association with the user, the online concierge system 102 determines 525 a replacement generic item description that satisfies the preference stored in association with the user as further described above. However, in response to determining the generic item description does satisfies the preference stored in association with the user, the online concierge system 102 does not determine 525 a replacement generic item description for the item.

In response to determining 525 to replace the generic item description in the selected recipe with the replacement generic item description connected to the generic item description via the directed edge in the replacement graph, the online concierge system 102 modifies 530 the selected recipe by replacing the generic item description with the replacement generic item description. To maintain accuracy of the combination of generic item descriptions and their corresponding amounts, when modifying 530 the selected recipe, the online concierge system 102 replaces a quantity of the generic item description specified by the selected recipe with an alternative quantity of the replacement generic item description, with the alternative quantity determined from the quantity of the generic item description specified by the selected recipe and the replacement quantity for the replacement generic item description included in the replacement graph. For example, the online concierge system 102 determines the alternative quantity so a ratio of the alternative quantity of the replacement generic item description to the quantity of the generic item description specified by the selected recipe equals a ratio of the replacement quantity of the replacement generic item description to a quantity of the generic item description identified by the replacement graph. Hence, the online concierge system 102 modifies 530 the selected recipe by replacing the generic item description and the quantity of the generic item description with the replacement generic item description and the alternative quantity of the replacement generic item description determined from the replacement graph.

When modifying 530 the selected recipe, the online concierge system 102 includes instructions for visually distinguishing the replacement generic item description and the alternative quantity from generic item descriptions originally included in the selected recipe. For example, the replacement generic item description and the alternative quantity are displayed in a different color or in a different font than the generic item descriptions originally included in the selected recipe. Additionally or alternatively, the modified selected recipe includes instructions that, when executed by a client device displaying the modified selected recipe, cause the client device to display a selectable interface element (e.g., a radio button, a slider) proximate to the replacement generic item description along with a prompt to reverse the replacement of the generic item description with the replacement generic item description. In response to receiving a specific interaction with the selectable interface element via the client device, the online concierge system 102 replaces the replacement generic item description and its alternative quantity with the generic item description and the corresponding quantity of the generic item description from the selected recipe. Hence, the user may reverse the replacement of the generic item description with the replacement generic item description by interacting with the selectable interface element. In some embodiments, the online concierge system 102 modifies the name of the selected recipe to provide an indication that one or more generic item descriptions in the recipe have been replaced by corresponding replacement generic item descriptions. For example, the online concierge system 102 appends a preference included in a directed edge from a generic item description included in the selected recipe to a replacement generic item description to indicate to the user that the selected recipe has been modified 530. The online concierge system 102 transmits 535 the modified selected recipe to a client device of the user for display.

Figure 6:
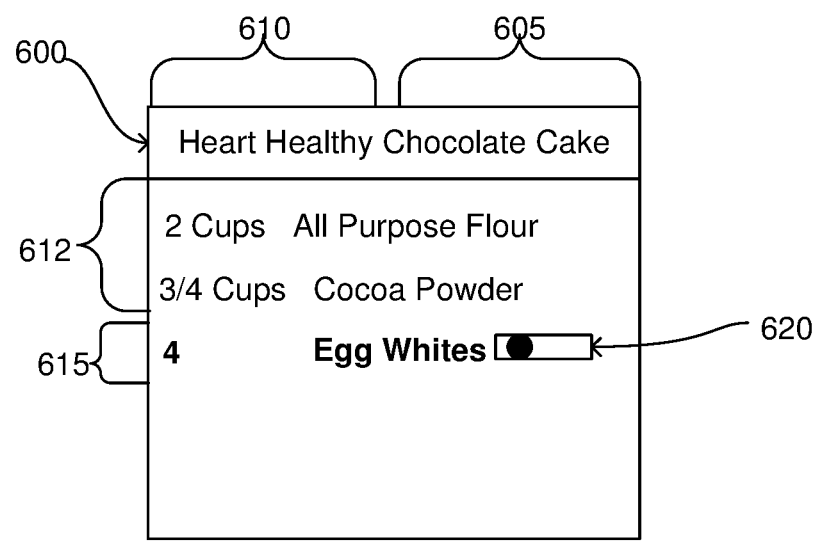
FIG. 6 shows an example display of a modified recipe including a replacement generic item description selected for a generic item description, according to one embodiment.

FIG. 6 shows an example display of a modified recipe 600. In the example of FIG. 6, the title 605 of the modified recipe 600 is modified by including a preference 610 from a directed edge connecting a generic item description in the recipe to a replacement generic item description. While FIG. 6 shows the preference 610 displayed prior to the title 605 of the modified recipe 600, in other embodiments, the preference 610 is displayed after the title 605 of the modified recipe. The preference 610 may be visually distinguished from the title 605 of the recipe, such as by being displayed in a different color or in a different font, in some embodiments.

Generic item descriptions 612 and their corresponding quantities originally included in the modified recipe 600 are displayed. A replacement generic item description 615 for a generic item description originally included in the recipe 600 is displayed along with an alternative quantity of the replacement generic item description, with the replacement generic item description 615 and its alternative quantity determined as further described above in conjunction with FIG. 5. Additionally, a selectable interface element 620 is displayed proximate to the replacement generic item description 615. When the selectable interface element 620 has a first value, the replacement generic item description 615 and the alternative quantity are displayed, as shown in FIG. 6. However, when the selectable interface element 620 has a second value, the generic item description and its corresponding quantity originally included in the recipe are displayed in place of the replacement generic item description 615 and its alternative quantity. Interacting with the selectable interface element 620 allows the user to change the value of the selectable interface element 620, which changes whether the replacement generic item description 615 and alternative quantity or generic item description and corresponding quantity originally included in the recipe are displayed.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    obtaining, at an online concierge system, a plurality of recipes, each recipe including one or more generic item descriptions, a quantity corresponding to each of the one or more generic item descriptions, and instructions for combining the generic item descriptions included in the recipe;
    generating a replacement graph including generic item descriptions and directional edges a particular directional edge connecting between a generic item description and a replacement generic item description, the particular directional edge from the generic item description to the replacement generic item description having one or more preferences and having a replacement quantity of the replacement generic item description, wherein generating the replacement graph comprises:
        applying a machine learning model to generate scores of candidate replacement generic item descriptions relative to the generic item description, wherein training of the machine learning model comprises:
            retrieving a plurality of training datasets, each training dataset comprising a specific item, attributes of the specific item, and a label of a generic item description to which the specific item is classified,
            using the machine learning model to predict a classification of the specific item based on the attributes of the specific item,
            comparing the classification predicted by the machine learning model to the label of the generic item, and
            adjusting the machine learning model based on the comparison;
        selecting, for the generic item description, one of the candidate replacement generic item descriptions to generate the particular directional edge; and
    selecting a recipe for a user;
    retrieving one or more preferences stored in association with the user;
    determining to replace a generic item description in the selected recipe with the replacement generic item description in response to the replacement graph including a directed edge from the generic item description in the selected recipe to the replacement generic item description that includes a preference matching a preference stored in association with the user;
    modifying the selected recipe by replacing the generic item description in the selected recipe and a quantity corresponding to the generic item description in the selected recipe with the replacement generic item description and a replacement quantity of the replacement generic item description determined from the replacement quantity included in the directional edge and the quantity corresponding to the generic item description in the selected recipe; and
    transmitting the modified selected recipe to a client device for display to the user.

2. The method of claim 1, wherein the directional edge further includes one or more types of recipes.

3. The method of claim 2, wherein determining to replace the generic item description in the selected recipe with the replacement generic item description in response to the replacement graph including the directed edge from the generic item description in the selected recipe to the replacement generic item description that includes the preference matching the preference stored in association with the user comprises:
    determining to replace the generic item description in the selected recipe with the replacement generic item description (1) in response to the replacement graph including the directed edge from the generic item description in the selected recipe to the replacement generic item description that includes the preference matching the preference stored in association with the user and (2) in response to the directed edge from the generic item description in the selected recipe to the replacement generic item description including a recipe type matching a recipe type of the selected recipe.

4. The method of claim 2, wherein determining to replace the generic item description in the selected recipe with the replacement generic item description in response to the replacement graph including the directed edge from the generic item description in the selected recipe to the replacement generic item description that includes the preference matching the preference stored in association with the user comprises:
determining to replace the generic item description in the selected recipe with the replacement generic item description (1) in response to the replacement graph including the directed edge from the generic item description in the selected recipe to the replacement generic item description that includes the preference matching the preference stored in association with the user and (2) in response to the directed edge from the generic item description in the selected recipe to the replacement generic item description not including a recipe type matching a recipe type of the selected recipe.

5. The method of claim 1, wherein determining to replace the generic item description in the selected recipe with the replacement generic item description in response to the replacement graph including the directed edge from the generic item description in the selected recipe to the replacement generic item description that includes the preference matching the preference stored in association with the user comprises:
determining to replace the generic item description in the selected recipe with the replacement generic item description (1) in response to the replacement graph including the directed edge from the generic item description in the selected recipe to the replacement generic item description that includes the preference matching the preference stored in association with the user and (2) in response to the replacement graph not including a tag for the generic item description in the selected recipe indicating the generic item description in the selected recipe satisfies the preference stored in association with the user.

6. The method of claim 1, wherein transmitting the modified selected recipe to the client device for display to the user comprises:
transmitting the modified selected recipe with a modified title for display to the user, the modified title indicating replacement of the generic item description in the selected recipe with the replacement generic item description.

7. The method of claim 6, wherein the modified title includes the preference included in the directed edge from the generic item description in the selected recipe to the replacement generic item description matching the preference stored in association with the user.

8. The method of claim 1, wherein transmitting the modified selected recipe to the client device for display to the user comprises:
transmitting the modified selected recipe to the client device including instructions for visually distinguishing the replacement generic item description and the alternative quantity from generic item descriptions and corresponding quantities included in the selected recipe.

9. The method of claim 1, wherein transmitting the modified selected recipe to the client device for display to the user comprises:

transmitting the modified selected recipe to the client device including instructions that, when executed by the client device, cause the client device to display a selectable interface element proximate to the replacement generic item description and the alternative quantity, the selectable interface element having a value set to a first value indicating display of the replacement generic item description and the alternative quantity.

10. The method of claim 9, wherein the instructions, when executed by the client device, cause the client device to display the generic item description in the selected recipe and the quantity corresponding to the generic item description in the selected recipe in response to the client device receiving an interaction with the selectable interface element changing the value of the selectable interface element to a second value.

11. A computer program product comprising a non-transitory computer readable storage medium having instructions encoded thereon that, when executed by a processor, cause the processor to:
obtain, at an online concierge system, a plurality of recipes, each recipe including one or more generic item descriptions, a quantity corresponding to each of the one or more generic item descriptions, and instructions for combining the generic item descriptions included in the recipe;
generate a replacement graph including generic item descriptions and directional edges, a particular directional edge connecting between a generic item description and a replacement generic item description, the particular directional edge from the generic item description to the replacement generic item description having one or more preferences and having a replacement quantity of the replacement generic item description, wherein generating the replacement graph comprises:
applying a machine learning model to generate scores of candidate replacement generic item descriptions relative to the generic item description, wherein training of the machine learning model comprises:
retrieving a plurality of training datasets, each training dataset comprising a specific item, attributes of the specific item, and a label of a generic item description to which the specific item is classified,
using the machine learning model to predict a classification of the specific item based on the attributes of the specific item,
comparing the classification predicted by the machine learning model to the label of the generic item, and
adjusting the machine learning model based on the comparison;
selecting, for the generic item description, one of the candidate replacement generic item descriptions to generate the particular directional edge; and
select a recipe for a user;
retrieve one or more preferences stored in association with the user;
determine to replace a generic item description in the selected recipe with the replacement generic item description in response to the replacement graph including a directed edge from the generic item description in the selected recipe to the replacement generic item description that includes a preference matching a preference stored in association with the user;

modify the selected recipe by replacing the generic item description in the selected recipe and a quantity corresponding to the generic item description in the selected recipe with the replacement generic item description and a replacement quantity of the replacement generic item description determined from the replacement quantity included in the directional edge and the quantity corresponding to the generic item description in the selected recipe; and transmit the modified selected recipe to a client device for display to the user.

12. The computer program product of claim 11, wherein the directional edge further includes one or more types of recipes.

13. The computer program product of claim 12, wherein determine to replace the generic item description in the selected recipe with the replacement generic item description in response to the replacement graph including the directed edge from the generic item description in the selected recipe to the replacement generic item description that includes the preference matching the preference stored in association with the user comprises:

determine to replace the generic item description in the selected recipe with the replacement generic item description (1) in response to the replacement graph including the directed edge from the generic item description in the selected recipe to the replacement generic item description that includes the preference matching the preference stored in association with the user and (2) in response to the directed edge from the generic item description in the selected recipe to the replacement generic item description including a recipe type matching a recipe type of the selected recipe.

14. The computer program product of claim 12, wherein determine to replace the generic item description in the selected recipe with the replacement generic item description in response to the replacement graph including the directed edge from the generic item description in the selected recipe to the replacement generic item description that includes the preference matching the preference stored in association with the user comprises:

determine to replace the generic item description in the selected recipe with the replacement generic item description (1) in response to the replacement graph including the directed edge from the generic item description in the selected recipe to the replacement generic item description that includes the preference matching the preference stored in association with the user and (2) in response to the directed edge from the generic item description in the selected recipe to the replacement generic item description not including a recipe type matching a recipe type of the selected recipe.

15. The computer program product of claim 11, wherein determine to replace the generic item description in the selected recipe with the replacement generic item description in response to the replacement graph including the directed edge from the generic item description in the selected recipe to the replacement generic item description that includes the preference matching the preference stored in association with the user comprises:

determine to replace the generic item description in the selected recipe with the replacement generic item description (1) in response to the replacement graph including the directed edge from the generic item description in the selected recipe to the replacement generic item description that includes the preference matching the preference stored in association with the user and (2) in response to the replacement graph not including a tag for the generic item description in the selected recipe indicating the generic item description in the selected recipe satisfies the preference stored in association with the user.

16. The computer program product of claim 11, wherein transmit the modified selected recipe to the client device for display to the user comprises:

transmit the modified selected recipe with a modified title for display to the user, the modified title indicating replacement of the generic item description in the selected recipe with the replacement generic item description.

17. The computer program product of claim 16, wherein the modified title includes the preference included in the directed edge from the generic item description in the selected recipe to the replacement generic item description matching the preference stored in association with the user.

18. The computer program product of claim 11, wherein transmit the modified selected recipe to the client device for display to the user comprises:

transmit the modified selected recipe to the client device including instructions for visually distinguishing the replacement generic item description and the alternative quantity from generic item descriptions and corresponding quantities included in the selected recipe.

19. The computer program product of claim 11, wherein transmit the modified selected recipe to the client device for display to the user comprises:

transmit the modified selected recipe to the client device including instructions that, when executed by the client device, cause the client device to display a selectable interface element proximate to the replacement generic item description and the alternative quantity, the selectable interface element having a value set to a first value indicating display of the replacement generic item description and the alternative quantity.

20. A system comprising:

one or more processors; and memory configured to store code comprising instructions, wherein the instructions, when executed by the one or more processors, cause the one or more processors to:

obtain, at an online concierge system, a plurality of recipes, each recipe including one or more generic item descriptions, a quantity corresponding to each of the one or more generic item descriptions, and instructions for combining the generic item descriptions included in the recipe;

generate a replacement graph including generic item descriptions and directional edges, a particular directional edge connecting between a generic item description and a replacement generic item description, the particular directional edge from the generic item description to the replacement generic item description having one or more preferences and having a replacement quantity of the replacement generic item description, wherein generating the replacement graph comprises:

applying a machine learning model to generate scores of candidate replacement generic item descriptions relative to the generic item description, wherein training of the machine learning model comprises:

retrieving a plurality of training datasets, each training dataset comprising a specific item, attributes of the specific item, and a label of a generic item description to which the specific item is classified, using the machine learning model to predict a classification of the specific item based on the attributes of the specific item, comparing the classification predicted by the machine learning model to the label of the generic item, and adjusting the machine learning model based on the comparison;

selecting, for the generic item description, one of the candidate replacement generic item descriptions to generate the particular directional edge; and select a recipe for a user;

retrieve one or more preferences stored in association with the user;

determine to replace a generic item description in the selected recipe with the replacement generic item description in response to the replacement graph including a directed edge from the generic item description in the selected recipe to the replacement generic item description that includes a preference matching a preference stored in association with the user;

modify the selected recipe by replacing the generic item description in the selected recipe and a quantity corresponding to the generic item description in the selected recipe with the replacement generic item description and a replacement quantity of the replacement generic item description determined from the replacement quantity included in the directional edge and the quantity corresponding to the generic item description in the selected recipe; and transmit the modified selected recipe to a client device for display to the user.

* * * * *